US011219874B2

(12) United States Patent
Bormes et al.

(10) Patent No.: US 11,219,874 B2
(45) Date of Patent: Jan. 11, 2022

(54) IN-LINE CARBONATION OF WATER-BASE BEVERAGES

(71) Applicant: Luxembourg Patent Company S.A., Lintgen (LU)

(72) Inventors: Sascha Bormes, Kenn (DE); Maris Wall, Luebbecke (DE); Isabelle Schmitz, Heisdorf (LU); Stephan Heitz, Rehlingen Siersburg (DE)

(73) Assignee: ROTAREX S.A., Lintgen (LU)

( * ) Notice: Subject to any disclaimer, the term of this patent is extended or adjusted under 35 U.S.C. 154(b) by 864 days.

(21) Appl. No.: 15/118,927

(22) PCT Filed: Feb. 18, 2015

(86) PCT No.: PCT/EP2015/053358
§ 371 (c)(1),
(2) Date: Aug. 15, 2016

(87) PCT Pub. No.: WO2015/124590
PCT Pub. Date: Aug. 27, 2015

(65) Prior Publication Data
US 2016/0354734 A1 Dec. 8, 2016

(51) Int. Cl.
*B01F 3/04* (2006.01)
*B01F 5/04* (2006.01)
(Continued)

(52) U.S. Cl.
CPC ...... *B01F 3/04815* (2013.01); *B01F 3/04439* (2013.01); *B01F 5/0428* (2013.01);
(Continued)

(58) Field of Classification Search
CPC ........ B01F 3/04808; B01F 2003/04893; B01F 3/04787; B67D 1/0058; B67D 1/12; B67D 1/1255; B67D 1/1266; Y10S 261/07
See application file for complete search history.

(56) References Cited

U.S. PATENT DOCUMENTS 5,842,600 A 12/1998 Singleterry et al.
8,177,197 B1 * 5/2012 Ergican ................. B01F 3/0446 261/78.2

(Continued)

FOREIGN PATENT DOCUMENTS

DE 102006047263 A1 4/2008
DE 102012100844 A1 8/2013

(Continued)

OTHER PUBLICATIONS

International Search Report dated May 8, 2015 for parent PCT application PCT/EP2015/053358.

*Primary Examiner* — Elizabeth Insler
(74) *Attorney, Agent, or Firm* — James E. Walton

(57) ABSTRACT

The invention is directed to a device (1) and a process for dissolving a gas into a liquid like carbonating a water based beverage, comprising a pump (4) for the liquid, a mixing venture nozzle (8) with a main inlet (10) fluidly connected to the pump (4), at least one side inlet (14) connectable to a source of pressurized gas (6), and an outlet. The device (1) comprises also a conical flow restrictor (24) fluidly downstream of the mixing venture nozzle (8), and a pipe (20) of a length of at least 0.5 m fluidly interconnected between the mixing venture nozzle (8) and the flow restrictor (24).

19 Claims, 3 Drawing Sheets

(51) Int. Cl.

| | |
|---|---|
| ***A47J 31/46*** | (2006.01) |
| ***B01F 15/02*** | (2006.01) |
| ***B67D 1/00*** | (2006.01) |
| ***B67D 1/14*** | (2006.01) |
| ***B01F 5/06*** | (2006.01) |

(52) U.S. Cl.
CPC ........ *B01F 5/0655* (2013.01); *B01F 15/0248* (2013.01); *B67D 1/0058* (2013.01); *B67D 1/1422* (2013.01); *B01F 2003/049* (2013.01)

(56) References Cited

U.S. PATENT DOCUMENTS

| | | | | |
|---|---|---|---|---|
| 8,348,245 | B2 * | 1/2013 | Fischer | B01F 3/0446 261/76 |
| 8,567,767 | B2 * | 10/2013 | Fantappie | A23L 2/54 261/79.2 |
| 9,309,103 | B2 * | 4/2016 | Ergican | B67D 1/0058 |
| 9,770,694 | B2 * | 9/2017 | Psilander | B01F 5/0473 |
| 2012/0038068 | A1 * | 2/2012 | Bormes | B01F 3/04787 261/64.3 |

FOREIGN PATENT DOCUMENTS

| | | | |
|---|---|---|---|
| FR | 2949355 | A1 | 3/2011 |
| GB | 2436558 | A | 10/2007 |
| WO | 2009021960 | A1 | 2/2009 |

* cited by examiner

IN-LINE CARBONATION OF WATER-BASE BEVERAGES

TECHNICAL FIELD

The invention is directed to dissolving gas into a liquid, more particularly to the preparation of the water-based beverages, even more particularly to the in-line carbonation of such beverages.

BACKGROUND ART

Prior art patent document published WO 2009/021960 A1 discloses a device for the enrichment of a liquid stream with a gas, e.g. for the carbonation of a beverage like water. The device comprises a flow mixer with a venturi nozzle having a rotationally symmetrical contraction and being flown through axially by the liquid stream. The device further comprises a lateral feed of the gas into the contraction of the venturi nozzle. The gas feed comprises at least one gas channel with a reduced diameter, ending laterally in the contraction of the venturi nozzle in such a way that the elongated longitudinal axis thereof is offset with regard to the longitudinal axis of the venturi nozzle.

This teaching is interesting in that the venturi nozzle is optimized with regard to the position and orientation of the gas channels. The process of carbonation of water is however dependent on different factors like temperature and pressure. The presence of low temperature is particularly favorable for carbonating water. This is why a cooling unit is provided in this teaching, upstream of the mixing venturi nozzle. The presence of such a cooling unit is however disadvantageous with regard to the manufacture and running costs of the device. In the absence of such a unit, the amount of carbon dioxide dissolved in the water by means of the device of this teaching can be too low, in particular in the presence of warmer temperatures, e.g. during summertime.

Prior art patent documents published DE 10 2012 100 844 A1 discloses a similar device for carbonating wine-based beverages. Similarly to the device of the previous document, this device comprises a cooling unit between the pump and the mixing chamber. Unlike in the previous document, this device comprises, in addition, a static mixer downstream of the mixing chamber. This static mixer comprises a tube housing a series of spiral-shaped mixing elements that are configured such that the liquid is subject to a pressure drop of about 0.5 bar between the inlet and the outlet of the static mixer. This static mixer is intended to provide a high mixing rate of the carbon dioxide with the liquid. It is also intended to avoid the formation of foam, thereby allowing a convenient drawing of the carbonated liquid at the exit of the device. The working pressure in the mixing chamber is of about 2 bar, so that the liquid exits the static mixer with a pressure of about 1.5 bar. Similarly to the above document, this device has the inconvenient that it requires a cooling unit. In addition, the static mixer is a complicated element that causes a significant pressure drop and that can be expensive in manufacture as well as in maintenance.

Prior art patent document published FR 2 949 355 B1 discloses device for carbonating water-based beverages that is similar to the device of the previous document. Indeed, it comprises also a static mixer downstream of the mixing chamber, this static mixer creating an intended progressive pressure drop to progressively bring the liquid to a pressure close to atmospheric pressure at the exit tap.

Prior art patent document published U.S. Pat. No. 5,842,600 discloses also a device for carbonating water or water-based beverages. Similarly to the device of the two previous documents (DE 10 2012 100 844 A1 and FR 2 949 355 B1), it comprises a static mixer comprising a tube housing a series of spiral-shaped mixing elements.

SUMMARY OF INVENTION

Technical Problem

The invention has for technical problem to provide an improved enrichment of a liquid with gas, like carbonation of water-based beverages, i.e. an enrichment that is cheaper and achieves a satisfying amount of gas dissolved in the beverage.

Technical Solution

The invention is directed to a device for dissolving gas like carbon dioxide into a liquid like a water-based beverage, comprising: a pump for the liquid; a mixing venturi nozzle with a main inlet fluidly connected to the pump, at least one side inlet connectable to a source of pressurized gas, and an outlet; wherein the device further comprises: a conical flow restrictor fluidly connected downstream of the mixing venturi nozzle; and a pipe of a length of at least 0.5 m fluidly interconnected between the mixing venturi nozzle and the flow restrictor.

The cone of the flow restrictor is preferably oriented so as to diverge in the flow direction.

According to a preferred embodiment of the invention, the pipe is a corrugated pipe, preferably a flexible corrugated pipe, more preferably a flexible stainless steel corrugated pipe, even more preferably a flexible stainless steel corrugated pipe with a plastic external sleeve.

According to a preferred embodiment of the invention, the corrugated pipe forms corrugation ridges with a height h that is comprised between 5% and 20% of the internal diameter d of the pipe and/or with a distance/between adjacent ridges that is comprised between 5% and 30%, preferably between 10% and 20% of the internal diameter d of the pipe.

According to a preferred embodiment of the invention, the pipe has an internal diameter d that is comprised between 5 mm and 25 mm, preferably between 8 mm and 20 mm, more preferably between 10 mm and 15 mm.

According to a preferred embodiment of the invention, the pipe has a wall thickness e that is comprised between 0.15 mm and 0.3 mm.

According to a preferred embodiment of the invention, the pipe has a length that is of at least 0.8 m, preferably at least 1.0 m, more preferably at least 1.2 m.

According to a preferred embodiment of the invention, the pipe has a length that is less than 5 m, preferably less than 2 m, more preferably less than 1.5 m.

According to a preferred embodiment of the invention, the pipe is bent at several places over at least 90°, preferably over about 180°, so as to form a compact unit.

According to a preferred embodiment of the invention, the pump is configured to pressurize the liquid at a pressure of at least 8 bar, preferably 9 bar, more preferably 10 bar, between said pump and the mixing venturi nozzle.

According to a preferred embodiment of the invention, the conical flow restrictor is configured to maintain a pressure in the pipe that is comprised between 6 bar and 10 bar, preferably between 7 bar and 9 bar, while debiting the liquid.

According to a preferred embodiment of the invention, the flow section of the conical flow restrictor progressively increases in the direction of the flow.

According to a preferred embodiment of the invention, the conical flow restrictor comprises a housing with a circular internal surface that diverges in the direction of the flow, and a conical element inside said housing delimiting with said diverging internal surface an annular flow section.

According to a preferred embodiment of the invention, the minimal flow section of the conical flow restrictor is comprised between 1 $mm^2$ and 10 $mm^2$, preferably between 2 $mm^2$ and 8 $mm^2$, more preferably between 2.8 $mm^2$ and 5.6 $mm^2$.

According to a preferred embodiment of the invention, it comprises a shut-off valve fluidly between the conical flow restrictor and the mixing venturi nozzle.

According to a preferred embodiment of the invention, it further comprises a mixing chamber fluidly connected to the outlet of the mixing venturi nozzle, the mixing chamber being preferably directly coupled to the mixing venturi nozzle so that said chamber is a direct extension of the outlet of said venturi nozzle.

The invention is also directed to a process for dissolving a gas into a liquid like carbonating a water based beverage, comprising the following steps:

(a) pressurizing the liquid in a circuit comprising a mixing venturi nozzle; and (b) adding the gas to said liquid flowing through the mixing venturi nozzle by connecting at least one side inlet of said venturi nozzle to a source of the pressurized gas; wherein the process comprises providing: a conical flow restrictor flu idly downstream of the mixing venturi nozzle; and a pipe of a length of at least 0.5 m fluidly interconnected between the mixing venturi nozzle and the flow restrictor.

According to a preferred embodiment of the invention, the process comprises using a device in accordance with the invention.

According to a preferred embodiment of the invention, step (b) comprises keeping the pressure in the pipe between 6 bar and 10 bar, preferably between 7 bar and 9 bar, by means of the flow restrictor.

Advantages of the Invention

The invention is particularly interesting in that it permits to in-line dissolve gas into a liquid, e.g. carbonate water or water-base beverages, by means of a device of a simple construction and still achieving a high grade of gas dissolved.

DESCRIPTION OF AN EMBODIMENT

Figure 1:
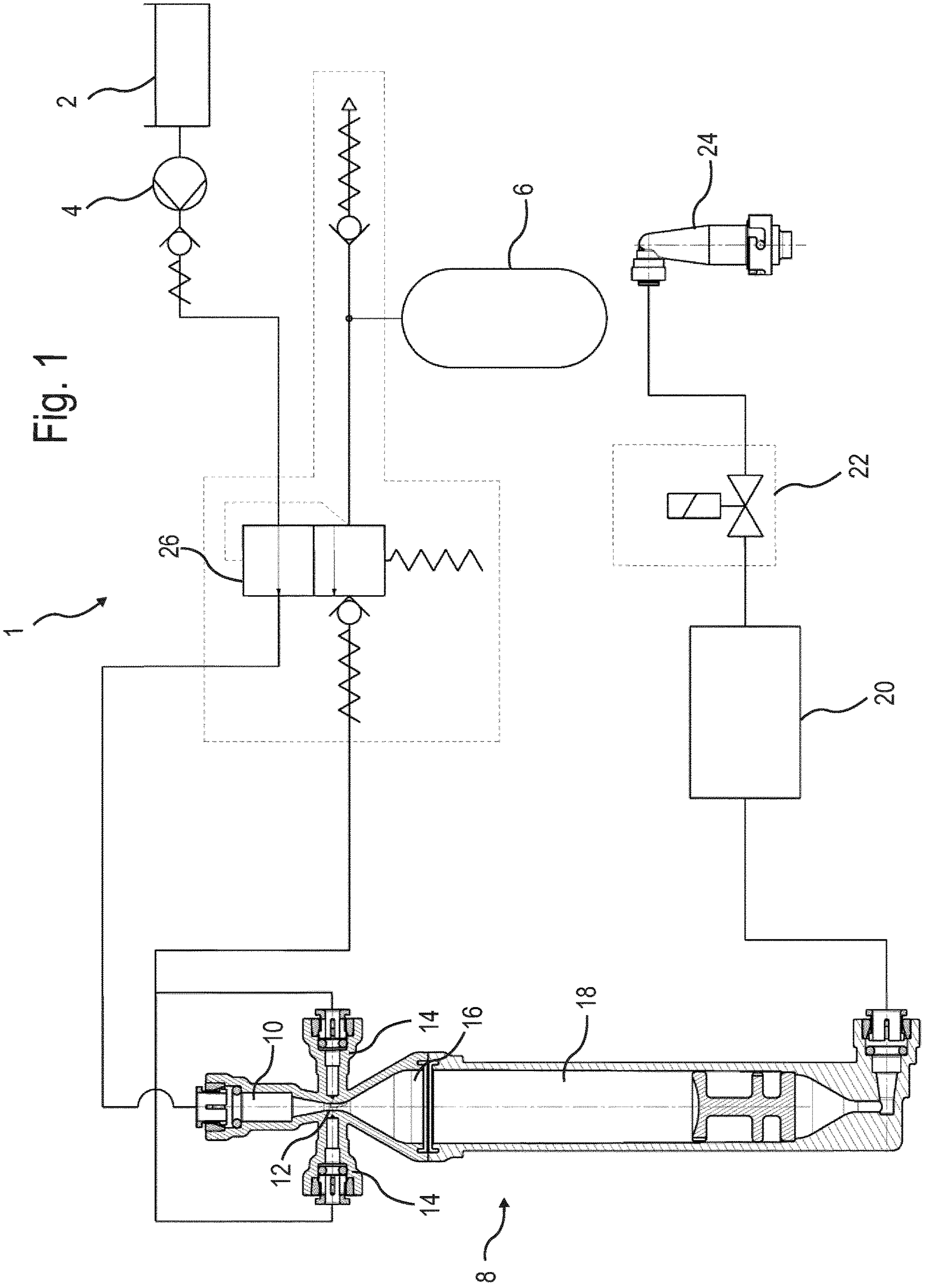
FIG. 1 discloses the architecture of a device for dissolving gas into a liquid, in accordance with the invention.

The device 1 that is schematically illustrated in FIG. 1 comprises a source of liquid 2, e.g. a source of water-based beverage like water. This source can be a tank filled with such a liquid. In the case of water, it can also be a connection to a water distribution circuit. The device 1 comprises also a pump 4 for pressurizing the liquid. The outlet of the pump 4 is connected to a mixing venturi nozzle 8. The nozzle 8 comprises a body with an inlet 10, a throat 12 and an outlet 16. In the flow direction, the throat 12 converges from the inlet 10 to a minimum section and then diverges to the outlet 16. The mixing venturi nozzle 8 comprises also lateral or side inlets 14 for the pressurized gas to be mixed with the liquid. The pressurized gas is stored in a tank or bottle 6. The side inlets 14 extend essentially radially with regard to the longitudinal axis (being vertical in the orientation of FIG. 1) of the mixing venturi nozzle 8. The conduits 14 join the throat 12 essentially at its minimum section, i.e. where the flowing speed of the liquid is at maximum.

A mixing chamber 18 is connected to the outlet 16 of the mixing venturi nozzle 8. In the present case, the mixing chamber 18 is coupled directly to the body of the mixing venturi nozzle 8 so that the outlet 16 of said nozzle is fed directly in the chamber 18. This chamber 18 is preferably elongate so as to allow the liquid and the gas to mix with each other and thereby to allow at least a portion of the gas to be dissolved in the liquid.

The exit of the mixing chamber 18 is connected to a unit 20 that is essentially made of a corrugated flexible pipe that is bent at several places so as to form a compact unit. The details of the pipe will be provided later in connection with FIGS. 3 and 4.

A shut-off valve 22 is connected at the exit of the piping unit 20 and a compensator or flow restrictor 24 is connected at the exit of the shut-off valve 22. The shut-off valve 22 can be manually or electromagnetically operated.

A pressure-reducer 26 between the source of pressurized carbon dioxide 6 and the inlets 14 on the mixing venturi nozzle 8. This pressure-reducer is a proportional one in that it adapts the pressure of the gas to the pressure of the liquid that is pressurized by the pump 4.

Figure 2:
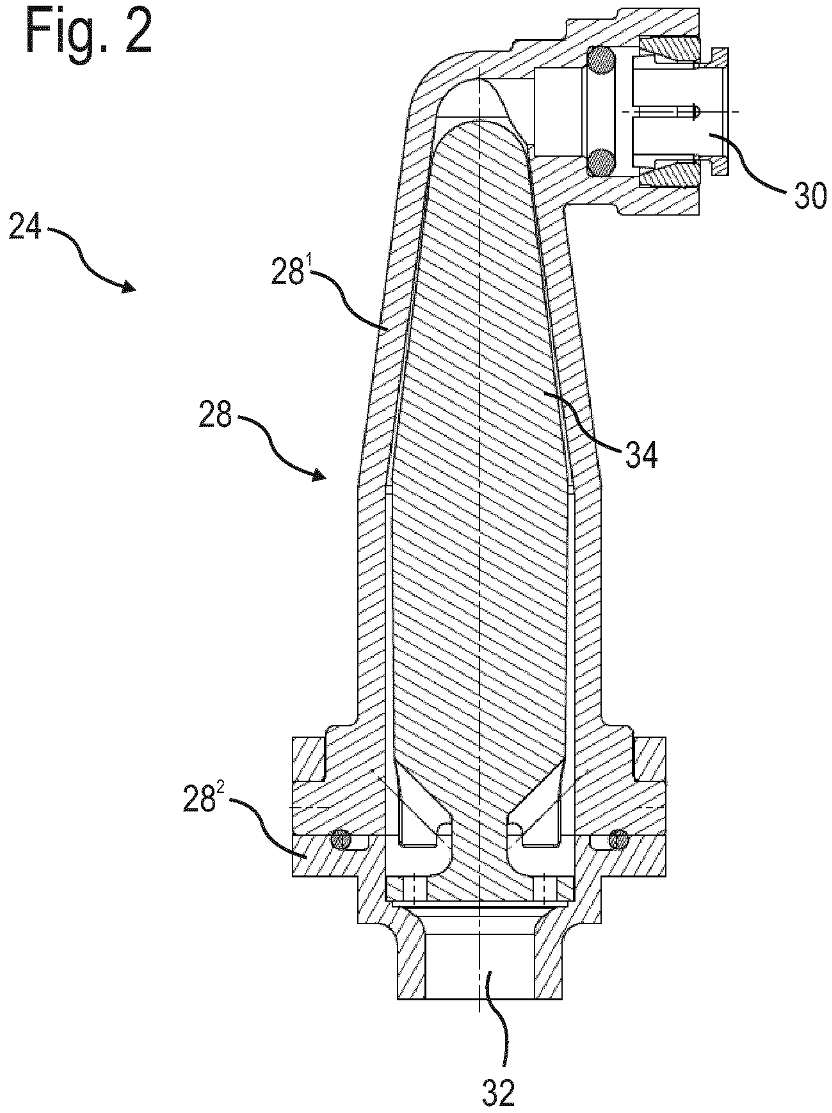
FIG. 2 is sectional view of the conical flow restrictor of the device of FIG. 1.

FIG. 2 is a sectional view of the flow restrictor 24 of FIG. 1. It comprises a body 28 that is made of a main body $\mathbf{28}^1$ and of a cap $\mathbf{28}^2$ that cooperates with the main body so as to close it. The main body $\mathbf{28}^1$ comprises an inlet 30 of the flow restrictor and forms a cavity delimited by a diverging surface along the normal flow direction inside that cavity. In the present illustration, this surface is conical along a first portion and cylindrical along a second portion following the first one in the normal flow direction. The cap $\mathbf{28}^2$ comprises an outlet 32 of the flow restrictor 24. It comprises also sealing means like a gasket for cooperating in a water tight fashion with the main body $\mathbf{28}^1$. In the present example, the main body $\mathbf{28}^1$ and the cap $\mathbf{28}^2$ cooperate with each other by means of quick coupling prongs and recesses. A conical element 34 is housed in the cavity of the flow restrictor 24. The external surface of this element 34 is essentially complementary with the internal surface of the housing. A gap is however provided between these two surfaces, this gap forming the flow section for the liquid. The conical element 34 is generally cone-shaped so as to essentially conform to the internal surface of the housing. Due to the diverging shape of the internal surface of the housing and of the corresponding external surface of the conical element 34, the flow section progressively increases along the flow direction, provided that the gap between these two surfaces remain constant or increases. In the present example, this gap progressively increases along the diverging portion of these surfaces, meaning that the flow section increases for two reasons, i.e. due to the increase of the diameter of the ring-shaped flow section, and also due to the increase of the width of that ring-shaped flow section. This gap can be comprised between 0.1 and 0.4 mm, preferably between 0.12 and 2 mm, more preferably of about 0.15 mm (with a tolerance of ±0.05 mm).

Still in the present example, the flow section passed the diverging surfaces, i.e. along the cylindrical surfaces is essentially constant.

The diverging surfaces allow a progressive deceleration of the liquid flow which avoids foaming. Indeed, a rapid pressure drop will release dissolved gas in a sudden manner, leading to foaming up of the liquid. The liquid exits therefore the diverging surfaces at a reduced speed can therefore gently exit the flow restrictor without splashing.

The position of the conical element 34 can be adjusted within the housing so as to adjust the flow section. The more the element 34 is inserted into the housing, the lower the flow section will be and vice versa. This position can be adjusted by inserting reference washers or any other spacer (s) between the element 34 and the cap $\mathbf{28}^2$. Alternatively, a lever acting on a cam abutting against the conical element could be provided for manually adjusting the position of the element without opening the flow restrictor 24. The end of the element 34 that abuts against the cap $\mathbf{28}^2$ is plate-shaped and comprises apertures for permitting the liquid to flow to the outlet 32.

The presence of the flow restrictor 24 is particularly interesting for it permits to keep a certain level of pressure upstream, i.e. in the mixing chamber 18 (FIG. 1) and in the mixing unit 20 (FIG. 1).

Figure 3:
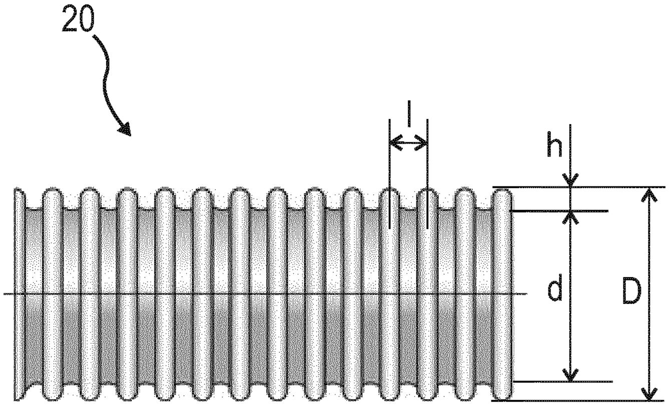
FIG. 3 is a view of portion of corrugated flexible pipe that is present between the flow restrictor and the mixing venturi nozzle of the device of FIG. 1.
Figure 4:
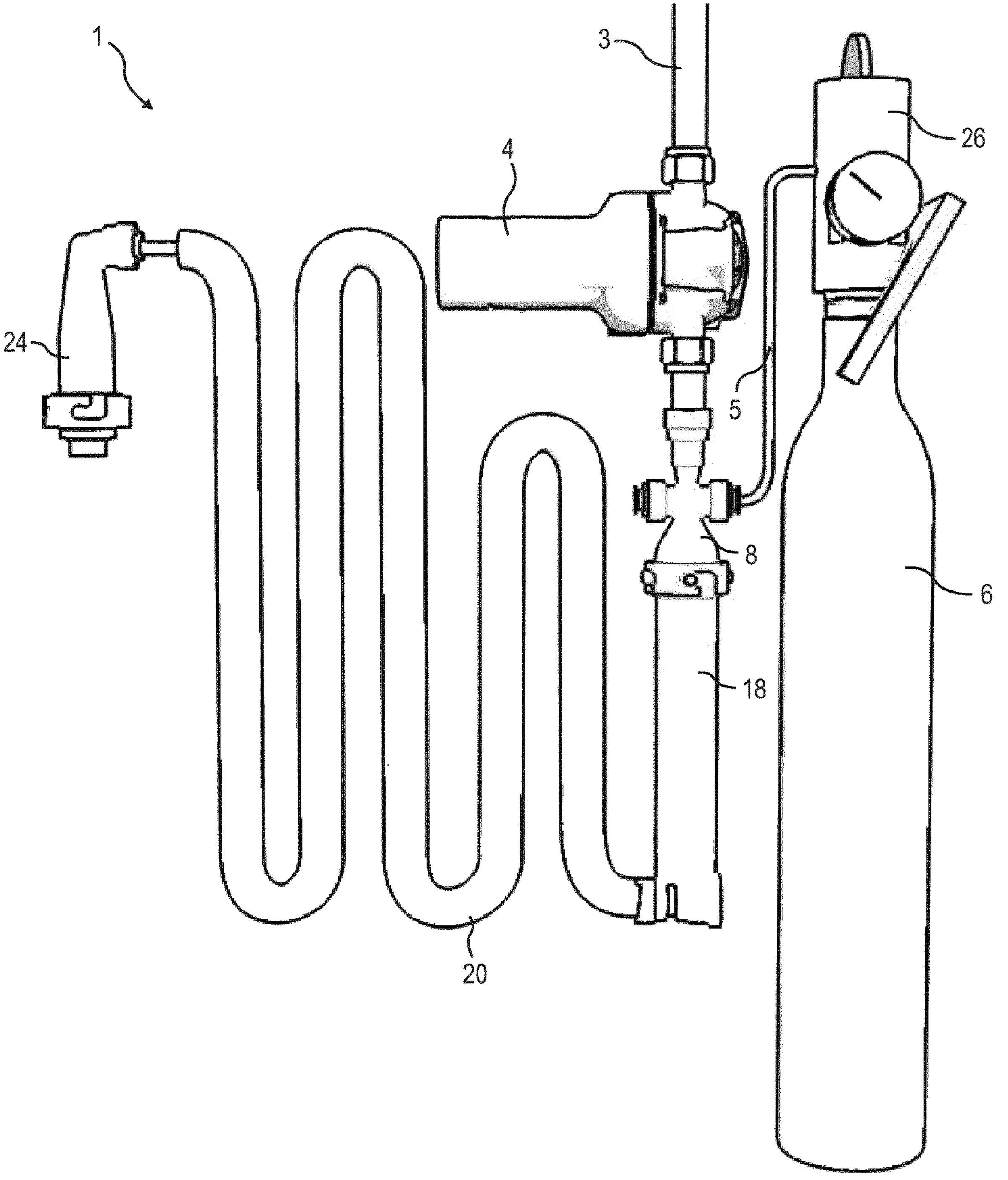
FIG. 4 is a general view of the device of FIG. 1, the device being connected to a source of pressurized carbon dioxide.

The mixing unit 20 of FIG. 1 is illustrated in FIGS. 3 and 4. The mixing unit is composed of a corrugated flexible pipe 20 of the type that is illustrated in FIG. 3. Such a pipe is as such available on the market and typically is characterized, among others, by its internal diameter d, its external diameter D, the height of its corrugation ridge h (that corresponds to (D−d)/2), the distance/between two adjacent corrugation ridges and the wall thickness e. The pipe is preferably made of stainless steel with an internal diameter d that is comprised between 5 mm and 25 mm, preferably between 8 mm and 20 mm, more preferably between 10 mm and 15 mm. The pipe is preferably a flexible stainless steel corrugated pipe with a plastic external sleeve. The height of the corrugation ridges is preferably comprised between 5% and 20% of the internal diameter of the pipe. The distance/ between adjacent ridges is preferably comprised between 5% and 35%, preferably between 15% and 30% of the internal diameter of the pipe. The pipe 20 has a length that is of at least 0.8 m, preferably at least 1.0 m, more preferably at least 1.2 m. This length can also be less than 5 m, preferably less than 2 m, more preferably less than 1.5 m.

FIG. 4 illustrates an embodiment of the device of FIG. 1. The device 1 comprises as water source a connection 3 to a water distribution network. The pump 4 pressurized the water for flowing through the mixing venturi nozzle 8, the mixing chamber 18, the pipe 20 and the flow restrictor 24. A bottle or cylinder 6 of pressurized gas is coupled to the pressure reducer 26, this latter being fluidly connected to the mixing venturi nozzle 8 via the conduit 5.

We can observe that the mixing unit formed by the pipe 20 comprises a series of bends along the length of the pipe in order to be compact. These bends can be of at least 90° or 180°.

The pump 4 is configured to pressurize the liquid at a pressure at the entry of the mixing venturi nozzle that is of at least 8 bar, preferably 9 bar, more preferably 10 bar, Due to the pressure drop that is inherent of the mixing venturi nozzle, the mixing chamber 18 and the pipe 20, the pressure at the exit of the pipe 24, i.e. before the flow restrictor 24 is of about 8 bar when the pressure at the entry of the mixing venturi nozzle of about 10 bar. Under such conditions, the liquid mixed with the carbon dioxide can therefore circulate along a substantial length of corrugated pipe at a relatively high pressure, thereby permitting a progressive dissolving of the gas into the liquid with however a very reduced pressure drop. The presence of the flow restrictor permits the pressure of the liquid to be reduced to atmospheric pressure when being tapped, with a progressive deceleration. This deceleration avoids rapid escape of the dissolved carbon dioxide and consequent splashing at the tap exit.

The above described device and corresponding carbonating process permits to achieve a high level of carbonation, i.e. at least 5 gr/liter and even of 8 gr/liter, with a device of simple construction. The device can achieve this carbonation level at room temperature, i.e. without cooling system.

The invention claimed is:

1. A device for dissolving a gas into a liquid, comprising:
- a pump configured to pump the liquid;
- a mixing venturi nozzle having a main inlet fluidly connected to the pump and at least one side inlet connectable to a source of pressurized gas, and an outlet;
- a conical flow restrictor fluidly downstream of the mixing venturi nozzle, comprising a body and a conical element housed in the body, a gap being provided between an external surface of the conical element and an internal surface of the body, said gap forming a flow section for the liquid, the conical element comprising a plate-shaped end abutting the body and provided with apertures for permitting liquid to flow to an outlet on the body; and
- a pipe fluidly interconnected between the mixing venturi nozzle and the flow restrictor.

2. The device according to claim 1, wherein the pipe comprises one of the following:
- a corrugated pipe;
- a flexible corrugated pipe;
- a flexible stainless steel corrugated pipe; and
- a flexible stainless steel corrugated pipe with a plastic external sleeve.

3. The device according to claim 2, wherein the corrugated pipe forms corrugation ridges with a height h comprising:
- between 5% and 20% of the internal diameter d of the pipe and/or with a distance/between adjacent ridges comprising one of the following:
- between 5% and 30% of the internal diameter of the pipe; and
- between 10% and 20% of the internal diameter of the pipe.

4. The device according to claim 1, wherein the pipe has an internal diameter d comprising one of the following:
- between 5 mm and 25 mm;
- between 8 mm and 20 mm; and
- between 10 mm and 15 mm.

5. The device according to claim 1, wherein the pipe has a wall thickness e comprising:
- between 0.15 mm and 0.3 mm.

6. The device according to claim 1, wherein a length of the pipe comprises one of the following:
- at least 0.8 m;
- at least 1.0 m; and
- at least 1.2 m.

7. The device according to claim 1, wherein a length of the pipe comprises one of the following:
- less than 5 m;

less than 2 m; and less than 1.5 m.

8. The device according to claim 1, wherein the pipe is bent at multiple places, so as to form a compact unit, the bends being made at one of the following:

over at least 90°; and over about 180°.

9. The device according to claim 1, wherein the pump is configured to pressurize the liquid between the pump and the mixing venturi nozzle at one of the following pressures:

at least 8 bar;

at least 9 bar; and at least 10 bar.

10. The device according to claim 1, wherein the conical flow restrictor is configured to maintain a pressure in the pipe while the device is in function that is comprised of one of the following:

between 6 bar and 10 bar; and between 7 bar and 9 bar.

11. The device according to claim 1, wherein a flow section of the conical flow restrictor progressively increases in the direction of the flow.

12. The device according to claim 1, wherein the conical flow restrictor comprises:

a housing with a circular internal surface that diverges in the direction of the flow; and a conical element inside the housing defining with said diverging internal surface an annular flow section.

13. The device according to claim 1, wherein the conical flow restrictor has a minimal flow section that is comprised of one of the following:

between 1 $mm^2$ and 10 $mm^2$;

between 2 $mm^2$ and 8 $mm^2$; and between 2.8 $mm^2$ and 5.6 $mm^2$.

14. The device according to claim 1, further comprising:

a shut-off valve fluidly disposed between the conical flow restrictor and the mixing venturi nozzle.

15. The device according to claim 1, further comprising:

a mixing chamber fluidly connected to the outlet of the mixing venturi nozzle, the mixing chamber being directly coupled to the mixing venturi nozzle, so that the mixing chamber is a direct extension of the outlet of the venturi nozzle.

16. The device according to claim 1, further comprising:

a pressure-reducer fluidly connected between, on one side, the pump and the source of pressurized gas, and, on the other side, the main inlet and the at least one side inlet of the mixing venturi nozzle, the pressure-reducer being configured for adapting the pressure of the gas at the at least one side inlet to the pressure of the liquid produced by the pump.

17. A process for dissolving a gas into a liquid, comprising:

providing a circuit having a mixing venturi nozzle;

pressurizing the liquid in the circuit;

adding the gas to the liquid flowing through the mixing venturi nozzle by connecting at least one side inlet of the venturi nozzle to a source of the pressurized gas;

providing a conical flow restrictor fluidly downstream of the mixing venturi nozzle, comprising a body and a conical element housed in the body, a gap being provided between an external surface of the conical element and an internal surface of the body, said gap forming a flow section for the liquid, the conical element comprising a plate- shaped end abutting the body and provided with apertures for permitting liquid to flow to an outlet on the body; and fluidly interconnecting a pipe between the mixing venturi nozzle and the flow restrictor.

18. The process according to claim 17, further comprising:

providing a pump; and pressurizing the liquid with the pump.

19. The process according to claim 17, further comprising:

using the flow restrictor and the pump to keep the pressure in the pipe at one of the following pressure ranges:

between 6 bar and 10 bar; and between 7 bar and 9 bar.

* * * * *